United States Patent [19]

Netravali et al.

[11] 4,125,856
[45] Nov. 14, 1978

[54] DIGITAL ENCODING AND DECODING OF COLOR VIDEO SIGNALS

[75] Inventors: Arun N. Netravali, Matawan; Charles B. Rubinstein, Colts Neck, both of N.J.

[73] Assignee: Bell Telephone Laboratories, Incorporated, Murray Hill, N.J.

[21] Appl. No.: 826,057

[22] Filed: Aug. 19, 1977

[51] Int. Cl.² ............................................. H04N 9/32
[52] U.S. Cl. ..................................................... 358/13
[58] Field of Search ................... 358/13, 133, 138, 263

[56] References Cited

U.S. PATENT DOCUMENTS

| | | | |
|---|---|---|---|
| 3,773,971 | 11/1973 | Sainte-Beuve | 358/13 |
| 3,803,348 | 4/1974 | Limb et al. | 358/13 |
| 3,860,953 | 1/1975 | Cutler et al. | 358/13 |
| 4,023,199 | 5/1977 | Netravali et al. | 358/13 |

*Primary Examiner*—Richard Murray
*Attorney, Agent, or Firm*—Barry H. Freedman

[57] ABSTRACT

A system for encoding and decoding a color video signal wherein information obtained from the luminance component is used to reduce the amount of color information which must be sent from encoder to decoder. In the encoder, at least two different predictions are made of the present luminance sample, based upon individual or combined values of the previous luminance samples. Each prediction is evaluated against the true luminance value, to determine the best predictor pattern or strategy. If good correspondence exists between the true luminance value and the best prediction thereof, the same prediction strategy is used to predict the present color component value from previous color component values. The predicted color component (chrominance or chromaticity) value is *not* sent to the decoder, but is stored in the encoder; the decoder reconstructs the same predicted color component value by determining the best luminance predictor and then using that predictor on previous color component values, in a manner identical to that used in the encoder.

If the correspondence between true and predicted luminance values is not good, it is assumed that the color component value is "unpredictable", so that the true color component value is then transmitted to the decoder. The decoder similarly detects the luminance prediction error, and therefore "expects" the true color component value transmission. The encoder further includes means for comparing each color component prediction with the true value thereof, to detect cases where the luminance is well predicted but the color component value is not. In this event, true color component value is also transmitted to the decoder and the luminance signal is intentionally "distorted" to signal this condition.

10 Claims, 8 Drawing Figures

DIGITAL ENCODING AND DECODING OF COLOR VIDEO SIGNALS

BACKGROUND OF THE INVENTION

1. Field of the Invention

This invention generally relates to the encoding and decoding of composite color video signals having separate luminance and color components and, in particular, to an adaptive technique which bases color component encoding/decoding on characteristics of the luminance signal, in order to reduce the amount of information needed to specify the composite video signal.

2. Description of the Prior Art

Even though composite color video signals may be represented in terms of separate color and luminance components, it is well known that various useful interrelationships exist between these components that can be exploited in order to increase encoding efficiency. For example, it was shown by A. N. Netravali and C. B. Rubinstein in U.S. Pat. No. 4,023,199 issued May 10, 1977 that busy picture areas, as indicated by large luminance signal activity, would tolerate encoding errors in the chrominance component much better than would flat picture regions. Accordingly, the quantizer characteristics of the chrominance encoders were adapted to the luminance signal activity, specifically, by using a coarse quantizer in active areas, and a fine quantizer only in flat regions. This adaption technique was successful in conserving bandwidth; however, both luminance and chrominance information was transmitted for each picture element.

In a second example, described in the copending application, Ser. No. 826,025, filed Aug. 19, 1977, by the present applicants, it was found that the luminance and color components, although being independent in value, exhibited certain similarities as to when *changes* occur, since picture edges generally contain both luminance and color discontinuities. This characteristic was used to advantage in DPCM encoding by forming a series of predictions of the present luminance sample, using various combinations of the previous luminance samples; each prediction was evaluated against the true luminance value, to determine the combinatorial pattern that yielded the best result, and this pattern was then used to combine previous color component samples to yield a prediction of the present sample. Here again, this technique worked well in reducing the prediction error in a DPCM encoder, but again had application only in systems wherein some clor information is transmitted for each picture element.

One system that altogether avoids transmission of chrominance information when such information is deemed redundant or unnecessary is described in U.S. Pat. No. 3,803,348 issued to J. O. Limb and C. B. Rubinstein on Apr. 9, 1974. In this system, advantage was again taken of the fact that significant changes in color information generally accompany significant changes in the luminance signal or, stated differently, that intensity edges usually have accompanying color transitions. Specifically, Limb et al. arranged to inhibit transmission of chrominance values until a significant luminance change occurred; only then was a chrominance value transmitted to the receiver, it being assumed in the interim that the chrominance value was an *average* of previous chrominance samples.

In an improvement to the Limb et al. technique, it was recognized in the C. C. Cutler, J. O. Limb and C. B. Rubinstein U.S. Pat. No. 3,860,953, issued Jan. 14, 1975, that important chrominance changes sometimes occur alone (i.e., without accompanying luminance changes). To account for this, the luminance signal was intentionally distorted to signal to the remote receiver that an updated chrominance value was arriving.

While the Limb et al. and Cutler et al. techniques were somewhat successful, it is important to note that a constant or average value was assumed for picture elements lying between elements for which significant luminance changes exist. As a result, no use was made of the luminance data between "significant" changes, and this reduced encoding efficiency. Moreover, if the threshold that determines when a luminance change is significant were to be lowered, then unnecessary chrominance information would be transmitted, again leading to a decrease in efficiency.

In view of the foregoing, it is the broad object of the present invention to increase the efficiency of encoding of color video signals, and particularly the color components thereof. Other objects are to eliminate the need to encode redundant color component information, and to thus transmit only significant changes. However, in the interim between such changes, the color component value must be updated by a selective extrapolation (or prediction) process which fully utilizes the available luminance information. In all events, the production of a subjectively pleasing rendition of the original object is, of course, essential.

SUMMARY OF THE INVENTION

The foregoing and additional objects are achieved by the present invention by forming several predictions of the present luminance sample using various different values, or combinations of values of previous luminance samples. The results of each prediction are evaluated by comparing it to the true luminance value; the value or combination of values which produced the best luminance prediction is used to predict or extrapolate the value of the next color component sample, using previous color information. The predicted color component value is *not*, however, sent to the decoder but is stored in the encoder; the decoder reconstructs the same predicted color component value by applying the identical technique to previously received luminance values, and to previous color component values stored in the decoder.

If the correspondence between true and predicted luminance values is not good, it is assumed that color component extrapolation will also be unsatisfactory. In this event, the true color component value is transmitted to the decoder, which similarly detects the luminance prediction error, and therefore "expects" transmission of the true color component value. The encoder further includes means for comparing each color component prediction with the true value thereof, to detect cases where the luminance is well predicted but the color component is not. In this event, the true color component value is also transmitted to the decoder, and the luminance signal is intentionally "distorted" to signal this condition.

From the foregoing description, it will be observed that the present invention fully utilizes the information contained in the luminance component to extrapolate color information at both the encoder and decoder. Hence, redundancy is reduced. Additionally, provision is made for the unusual cases where color components and luminance do not "track" well, or where the signal itself is deemed to be "unpredictable". Using modern digital techniques, the processing required by the present invention is easily implemented, and the added circuitry is more than adequately compensated for by bandwidth savings in the transmission medium connecting the encoder to the decoder.

As used in the preceding summary, the generic term "color components" is meant to include the portion of a composite video signal that conveys *color* information. Thus, "color components" may be "chromaticity" or "chrominance", or any other combination of information that is derived from the composite signal to represent its color characteristics. However, in the succeeding description, a luminance component Y and two chrominance components $C_1$ and $C_2$ will be used to describe a composite video signal, since "chrominance" is most often used in conventional color television systems to represent color information.

BRIEF DESCRIPTION OF THE DRAWING

The present invention will be more fully appreciated by consideration of the following detailed description, when read in light of the accompanying drawing in which.

DETAILED DESCRIPTION

Figure 1:
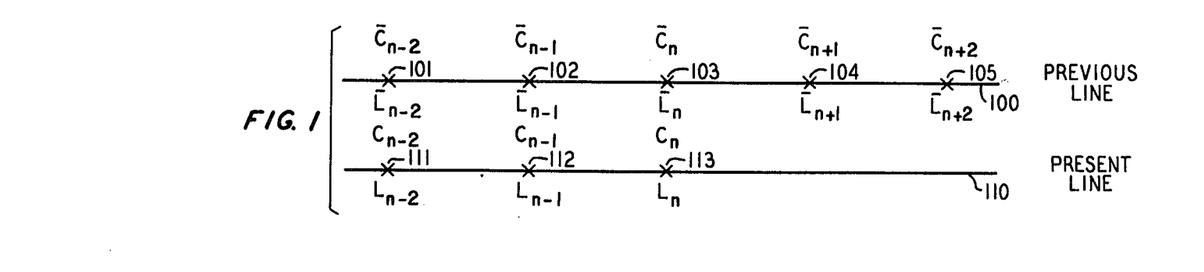
FIG. 1 illustrates the location of picture elements (pels) in the video signal being encoded, and the symbology for the luminance and chrominance values of each pel.

In FIG. 1, the chrominance and luminance values of a color video signal are sampled at a plurality of points or picture elements 101–105 and 111–113 which lie along a plurality of generally parallel scan lines, such as line 110 which contains the element 113 presently being processed, and line 100 which is the previous line. The luminance and chrominance values of the presently processed pel are represented as $L_n$ and $C_n$, respectively, it being understood that each pel has, in reality, two chrominance components $C_1$ and $C_2$ which may be independently processed in similar fashion, so that only one component C is shown for simplicity. Previous pels 112 and 111 on the present scan line (assuming scanning from left to right and from top to bottom in FIG. 1) are represented by luminance and chrominance components $L_{n-1}$, $C_{n-1}$ and $L_{n-2}$, $C_{n-2}$, respectively; other pels on line 110 bear similar notation.

In the previous line 100, the notation for luminance and chrominance components is $\overline{L}$ and $\overline{C}$, respectively. The components of element 103 immediately above the present element 113 is thus $\overline{L}_n$, $\overline{C}_n$, and pels 102 and 101 previous to pel 103 are represented $\overline{C}_{n-1}$, $\overline{L}_{n-1}$ and $\overline{C}_{n-2}$, $\overline{L}_{n-2}$, respectively. Pels 104 and 105 subsequent to pel 103 have luminance and chrominance components $\overline{L}_{n+1}$, $\overline{C}_{n+1}$ and $\overline{L}_{n+2}$, $\overline{C}_{n+2}$, respectively.

In certain encoding systems, it is to be noted that the luminance component is sampled at a rate several times higher than the rate used for chrominance, so that luminance samples not shown in FIG. 1 may be interspersed between the samples that are shown. However, it has been found that these "extra" luminance samples should not be used in the chrominance encoding strategy, since the luminance samples coincident with chrominance samples generally prove to be more accurate. These intervening luminance samples may be ignored by suitable filtering circuitry well known to those skilled in the art.

Figure 2:
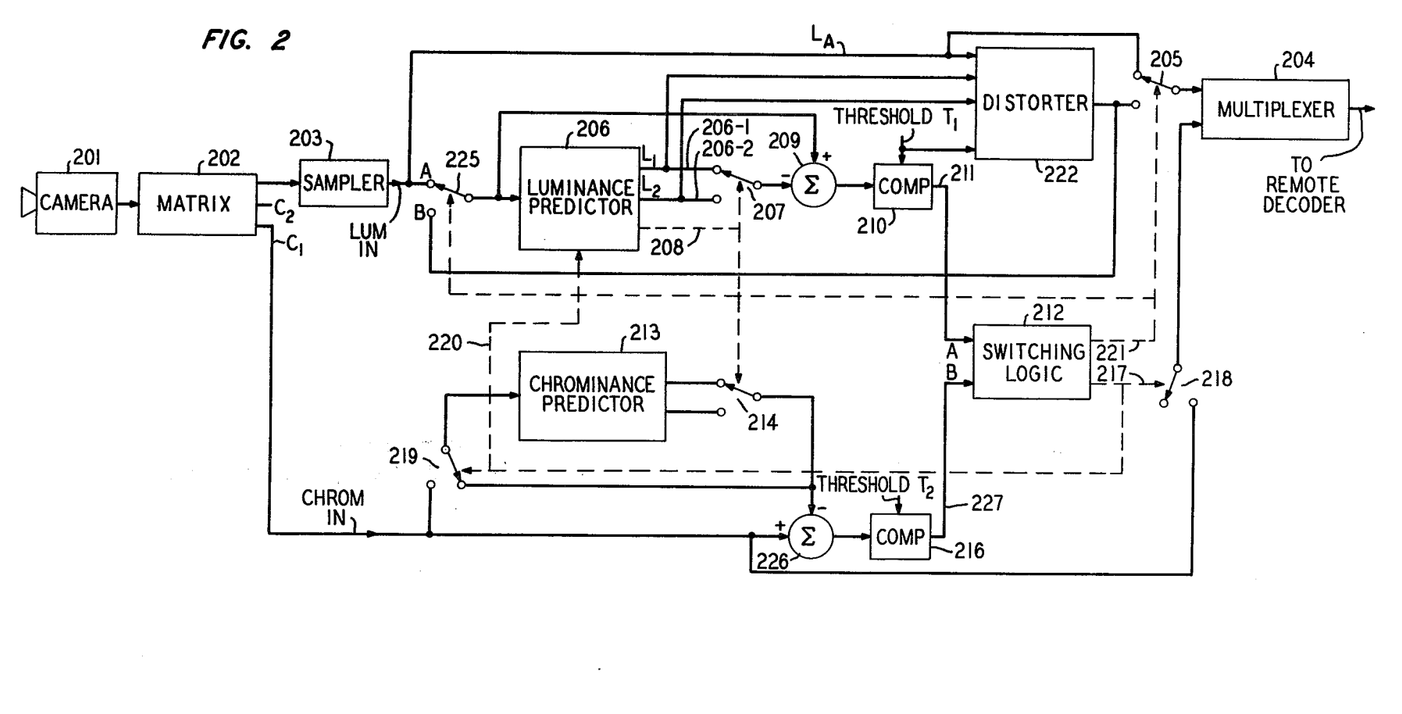
FIG. 2 is a general block diagram showing an adaptive color video signal encoder in accordance with the present invention.

Referring to FIG. 2, there is shown a color video signal encoder in accordance with the present invention. The encoder receives a composite color video signal generated by a scanner or camera 201, which is separated into chrominance components C1 and C2 and a luminance component Y by a conventional matrixing circuit 202. The luminance component is applied to a sampler 203, which forms a series of PCM values each representing the luminance value of a picture element in the signal being encoded. The luminance samples are applied to one input of a multiplexer 204 via a first switch 205, and also to the input of a luminance predictor 206 via a second switch 225. The output of multiplexer 204 is transmitted to a remote decoder shown in FIG. 8.

Luminance predictor 206, to be described in more detail hereinafter, is designed to produce at least two predictions or extrapolations of the *present* luminance $L_n$ sample, based upon the value of *previous* luminance samples, taken singly or in combination. Predictions may also be based on previously predicted luminance values. One prediction might be made, for example, based upon the weighted sum of the samples for the nearest pels $L_{n-1}$, $\overline{L}_{n-1}$, $\overline{L}_n$ and $\overline{L}_{n+1}$. A second prediction might combine the same pels with different weighting coefficients, and a third prediction might combine only three previous pels. For simplicity of description, the predictions made by predictor 206 will be hereafter assumed to be based upon the values of the previous sample $L_{n-1}$ and the sample $\overline{L}_n$ which is above the present sample in the previous line. Each of the predictions is made available on a separate output line, in this example, lines 206-1 and 206-2. A signal identifying which prediction is best is output on line 208, and is generated in a manner described hereinafter. This "best prediction" signal is used to control the position of a switch 207 so that the "best" prediction output from predictor 206 is coupled to one input of a difference circuit, which receives as a second input the true luminance value being input to predictor 206. The prediction error output from circuit 209 is coupled to a comparator 210 for comparison with a threshold value $T_1$. If the prediction error is below the threshold, a logic "0" is output on line 211, and applied to the "A" input of a logic circuit 212.

In accordance with the present invention, it is generally assumed that the same predictor used to produce the best luminance prediction will also yield the best chrominance prediction. Thus, a chrominance predictor 213 includes the same multiple predictors as are included in luminance predictor 206, each of which produces an extrapolation or prediction of the present chrominance sample, based upon one or more previous chrominance values or combinations thereof. The "best" chrominance prediction is determined by the position of a switch 214, under the control of the "best prediction" signal on line 208. The best chrominance prediction is subtracted in a second difference circuit 226 from the true chrominance value output from matrix 202, to yield a chrominance prediction error signal. The latter is compared with a second threshold value $T_2$ in a second comparator 216 and, if the error is below the threshold, a logic 0 is output on line 217 and applied to the "B" input of logic circuit 212.

If both the A and B inputs to logic 212 are 0's, then both the luminance and chrominance predictions are good approximations of the true luminance and chrominance values, respectively. In this event, the logic output on a first control line 217 is arranged to position switches 218 and 219 as shown in FIG. 2. Switch 218 opens the path between the chrominance output of matrix 202 and multiplexer 204, indicating that the chrominance value need not be transmitted to the remote location, since the chrominance prediction is satisfactory. Switch 219 is positioned to establish a connection between the output of chrominance predictor 213 and its input, via switch 214; as a result, the best chrominance prediction updates the chrominance values stored within predictor 213, so that it may be used in forming succeeding predictions.

In the event that the output of comparator 210 is a logic "1", indicating that the best luminance prediction deviates from its true value by more than an amount $T_1$, logic 212 is arranged to produce an output on line 217 which repositions switches 218 and 219. (This occurs independent of the value of the B input to logic 212.) Switch 218 then couples the true chrominance value from matrix 202 to multiplexer 204, which then sequentially transmits both true luminance and chrominance values to the remote decoder. Concurrently, switch 219 couples the true chrominance value to predictor 213, so that this value may be used in future predictions. Also, in this situation, a signal is sent to luminance predictor 206 on line 220, to be used, as hereinafter described, to indicate that a true chrominance value has been transmitted.

In the event that the output of comparator 210 is "0" but the output of comparator 216 is a "1", this indicates that the chrominance prediction deviates more than the amount $T_2$ from its true value, despite an adequate luminance prediction. This condition causes repositioning of switches 218 and 219, as described previously, again causing sequential transmission of both true luminance and chrominance values. In addition, a second output of logic 212 on line 221 is used to reposition switches 205 and 225. Switch 205 then acts to insert a distorter 222 (described hereinafter) in the luminance signal path between sampler 203 and multiplexer 204, to signal to the remote decoder that a true chrominance value will be transmitted following the true luminance value. Switch 225 then acts to couple the output of distorter 222 to the input of luminance predictor 206, so that the same luminance value transmitted to the remote decoder is used in succeeding luminance predictions. The distorter 222 also receives the various predictions output from predictor 206 on lines 206-1 and 206-2.

A summary of the operation of logic 212 is contained in the following table, assuming that switches 205, 218 and 219 remain in the positions shown in FIG. 2 when a "0" is applied thereto, and are repositioned when a "0" is applied:

| Input A (0=good luminance prediction) (1=bad luminance prediction) | Input B (0=good chrominance prediction) (1=bad chrominance prediction) | Line 217 | Line 221 |
| --- | --- | --- | --- |
| 0 | 0 | 0 | 0 |
| 0 | 1 | 1 | 1 |
| 1 | 0 or 1 | 1 | 0 |

Figure 3:
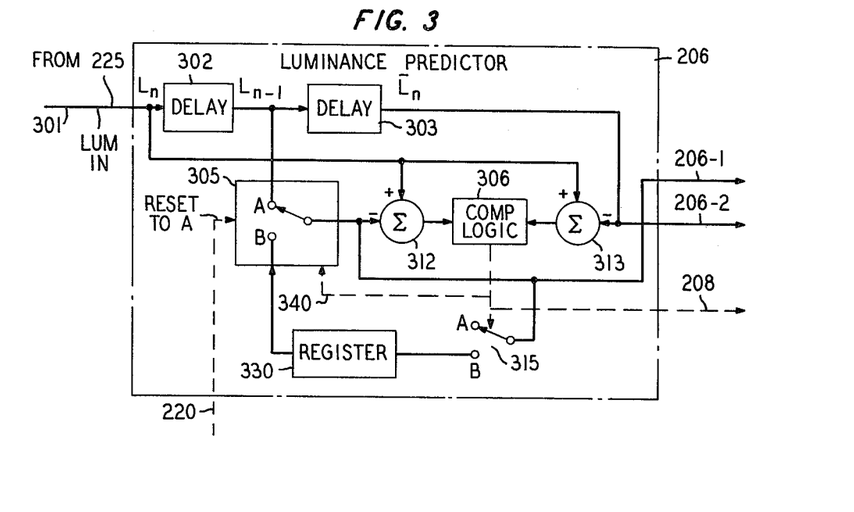
FIG. 3 is a block diagram of the luminance predictor portion of the encoder of FIG. 2.

Referring now to FIG. 3, one example of the internal arrangement of luminance predictor 206 is shown. In this example, it is again assumed that two predictions of the luminance sample are based simply on the individual values of samples $L_{n-1}$ and $\overline{L}_n$, the former being the sample immediately preceding the present sample and the latter being above the present sample but in the preceding line. It is again to be noted that this arrangement is illustrative, and that, the predictor can also use various other samples which can be combined with each other in numerous patterns, with suitable weighting and combinatorial circuits well known to those skilled in the art. (Reference is made to the predictors shown in FIGS. 5a and 5b of the aforementioned copending application Ser. No. 826,025, filed Aug. 19, 1977, which illustrate some of the other predictor arrangements that are possible.)

In the present example, the luminance predictions are generated simply by applying the coded luminance signal input from switch 225 on line 301 to series-connected delay circuits 302 and 303, the former providing a delay time of one sample interval and the latter providing a delay time of one line less one sample. Accordingly, if the input sample is designated $L_n$, the outputs of circuits 302 and 303 are $L_{n-1}$ and $\overline{L}_n$, respectively. These values can be referred to as predictions 1 and 2, respectively, for convenience, it being understood that the number of different predictions formed is determined by the degree of complexity desired. Prediction 2 is extended to output lines 206-2 directly; prediction 1 is extended to output line 206-1 via switch 305, for reasons to be explained below.

Assuming that switch 305 is initially in a first (A) position shown in FIG. 3, then the outputs of delay circuits 302 and 303 are applied to first inputs of differencing circuits 312 and 313, respectively, each of which receive a second input from line 301. The output of circuits 313 and 314, representing the prediction errors for predictions 1 and 2, are compared with each other in a comparison logic circuit 306. If predictor 1 produces the smaller error, logic 306 produces a first control signal which is output on line 208, while if predictor 2 produces the better prediction, a second control signal is output on line 208. If additional predictions were made, these too would be examined, with the output of logic 306 identifying the best predictor, i.e., the one producing the smallest error.

While the above-described circuit yields generally satisfactory luminance predictors, it has been found, through computer simulations, that better results can be achieved by a minor modification pertaining to the "definition" of the previous sample $L_{n-1}$ on the line being encoded. Specifically, it has been found that when a true *chrominance* value has been transmitted to the decoder, the corresponding predicted luminance value for that sample should be stored and used as the "previous sample" until the next time a chrominance value is transmitted. By this technique, prediction errors are not accumulated, and the stored luminance value yields a prediction which is less misleading than one formed using luminance samples not associated with true chrominance value transmissions. The storage referred to above is provided in a register 330, which receives and stores the luminance prediction $L_{n-1}$ when predictor 1 is the best predictor. This is accomplished by closing a switch 315 every time predictor 1 is selected by logic 306. The stored value is coupled through switch 305 in lieu of the output from delay circuit 302 when switch 305 is repositioned. Such repositioning occurs when comparator 306 selects predictor 1, via a control signal on line 340; switch 305 remains repositioned until the next true chrominance value is transmitted, whereupon it is reset to the position shown in FIG. 3 by application of a signal from line 206. In summary, switch 315 is repositioned every time previous element prediction (predictor 1) is selected by logic 306 and, when repositioned, stores the value of $L_{n-1}$ therein. Switch 305 then repositions to use this stored value (rather than the output of delay circuit 302) until switch 305 is reset by a true chrominance transmission as signaled on line 220.

Figure 4:
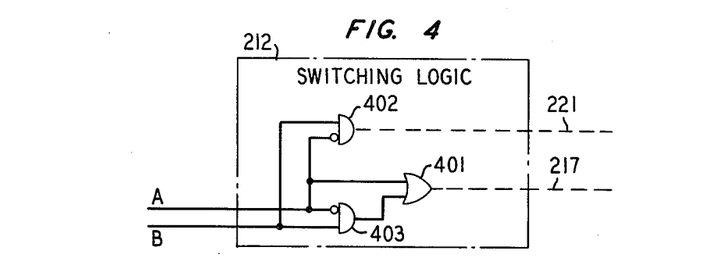
FIG. 4 is a block diagram of the switching logic portion of the encoder of FIG. 2.

Switching logic 212, described above, may be implemented quite simply, as shown in FIG. 4. If input A is high, one input to OR gate 401 is also high, making output line 217 high; AND gate 402 is simultaneously blocked, making output line 221 low. If both inputs A and B are low, both AND gates 402 and 403 are low, rendering both outputs 217 and 221 low. Finally, if input A is low while input B is high, both AND gates are open, and both outputs are also high.

As stated previously, the purpose of distorter circuit 222 is to indicate to the remote decoder that a true chrominance value is being transmitted from the encoder, in the case in which the luminance prediction is satisfactory but the chrominance prediction is not. This distorter thus avoids the need to send information to the decoder identifying the address of the true chrominance value.

In making the distortion, it is to be recognized that the decoder (described hereinafter) expects a true chrominance signal when the true luminance prediction deviates from all of the luminance prediction by a predetermined amount $T_1$. Thus, the distorter is designed to *assure* that the same luminance deviation by an amount $T_1$ exists in the case where the chrominance prediction error is too great (i.e., larger than a threshold $T_1$). It is also to be noted that the amount of luminance distortion or change should be minimized, so that picture quality is not adversely affected.

Figure 5:
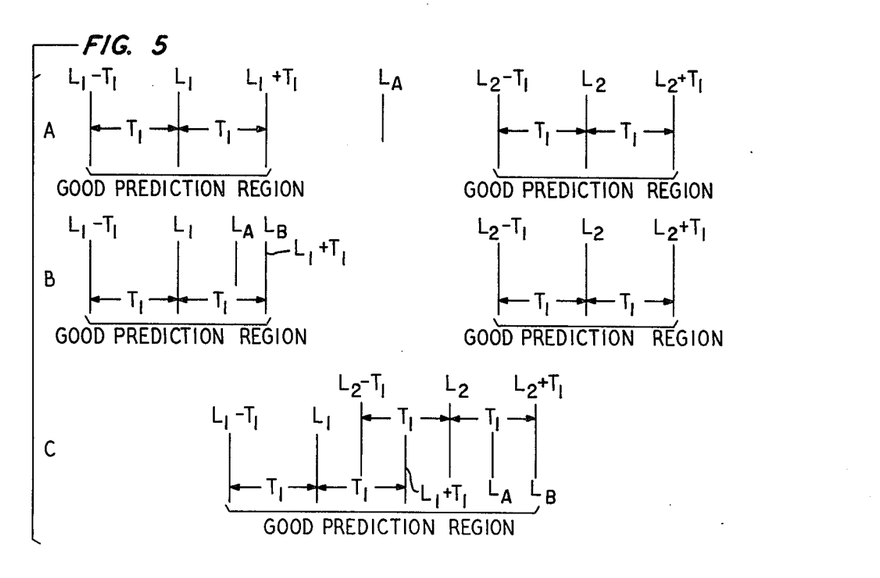
FIG. 5 is a diagram illustrating the strategy used in the distorter of FIG. 2.
Figure 7:
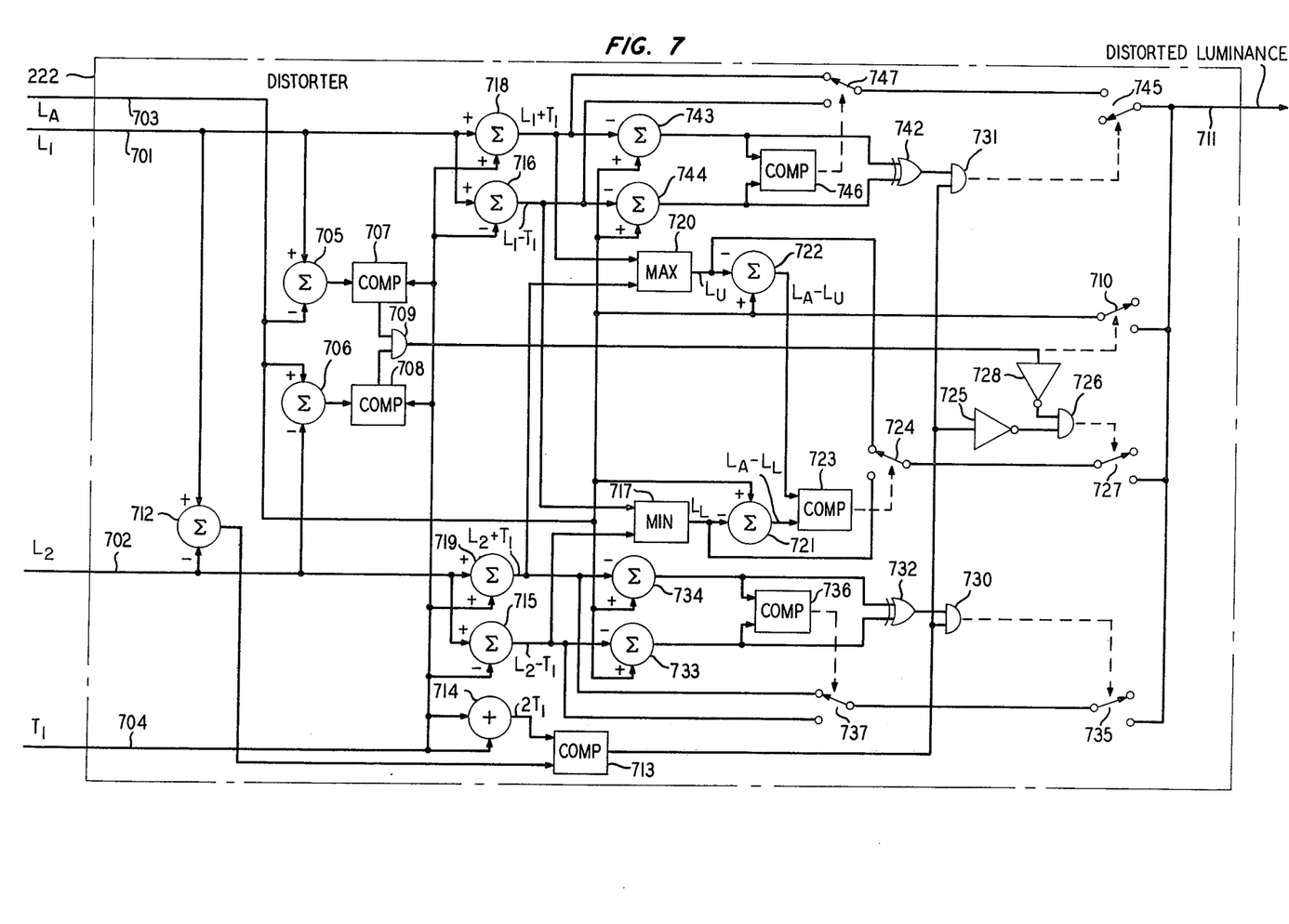
FIG. 7 is a block diagram of a distorter circuit.

The general strategy of the distorter circuit of FIG. 7 can be best understood by first referring to FIGS. 5A-5C, which illustrate possible relative positions of a true luminance value (hereafter $L_A$) and of predictions thereof (for example, $L_1$ and $L_2$) along a scale of possible luminance values. In FIG. 5A, predicted values $L_1$ and $L_2$ are separated from each other by a distance greater than twice the threshold value $T_1$, and the true luminance value $L_A$ differs from both $L_1$ and $L_2$ by an amount greater than $T_1$. Since, in this condition, the poor luminance predictions would necessitate transmission of the true chrominance value, the luminance value need not be distorted, and the value $L_A$ may be transmitted from encoder to decoder.

In FIG. 5B, the predictions again differ by more than $2T_1$. However, the difference between $L_1$ and $L_A$ is less than $T_1$, so that $L_1$ lies in a "good prediction region", which region is defined as having end values $L_1 \pm T_1$. In this event, $L_A$ must be changed to a different value $L_B$, which value differs from $L_1$ by at least $T_1$. ($L_B$ could differ from $L_1$ by more than $T_1$; however, since it is desirable to *minimize* the distortion that the circuit introduces, $L_B$ should only be changed to bring it just to the "border" of the good prediction region, wherein a true luminance value would be "expected" by the decoder.) Two choices exist in shifting $L_A$ to $L_B$, i.e., $L_B = L_1 + T$ or $L_1 - T$. Obviously, in FIG. 5B, the difference between $L_A$ and $L_1 + T$ is less than the difference between $L_A$ and $L_1 - T$, so that a value $L_B = L_1 + T$ is desired.

In FIG. 5C, the values of $L_1$ and $L_2$ differ by less than $2T_1$, so that the good prediction regions for $L_1$ and $L_2$ overlap. If $L_A$ lies outside of the combined region, then its value need not be changed, as discussed above; on the other hand, if $L_A$ is within the region, its value must be changed to $L_B$. To minimize the distortion caused by the change in value, $L_B$ should lie just at the border of the good prediction region closest to the value of $L_A$; in FIG. 5C, $L_B = L_2 + T_1$ would be chosen.

Figure 6:
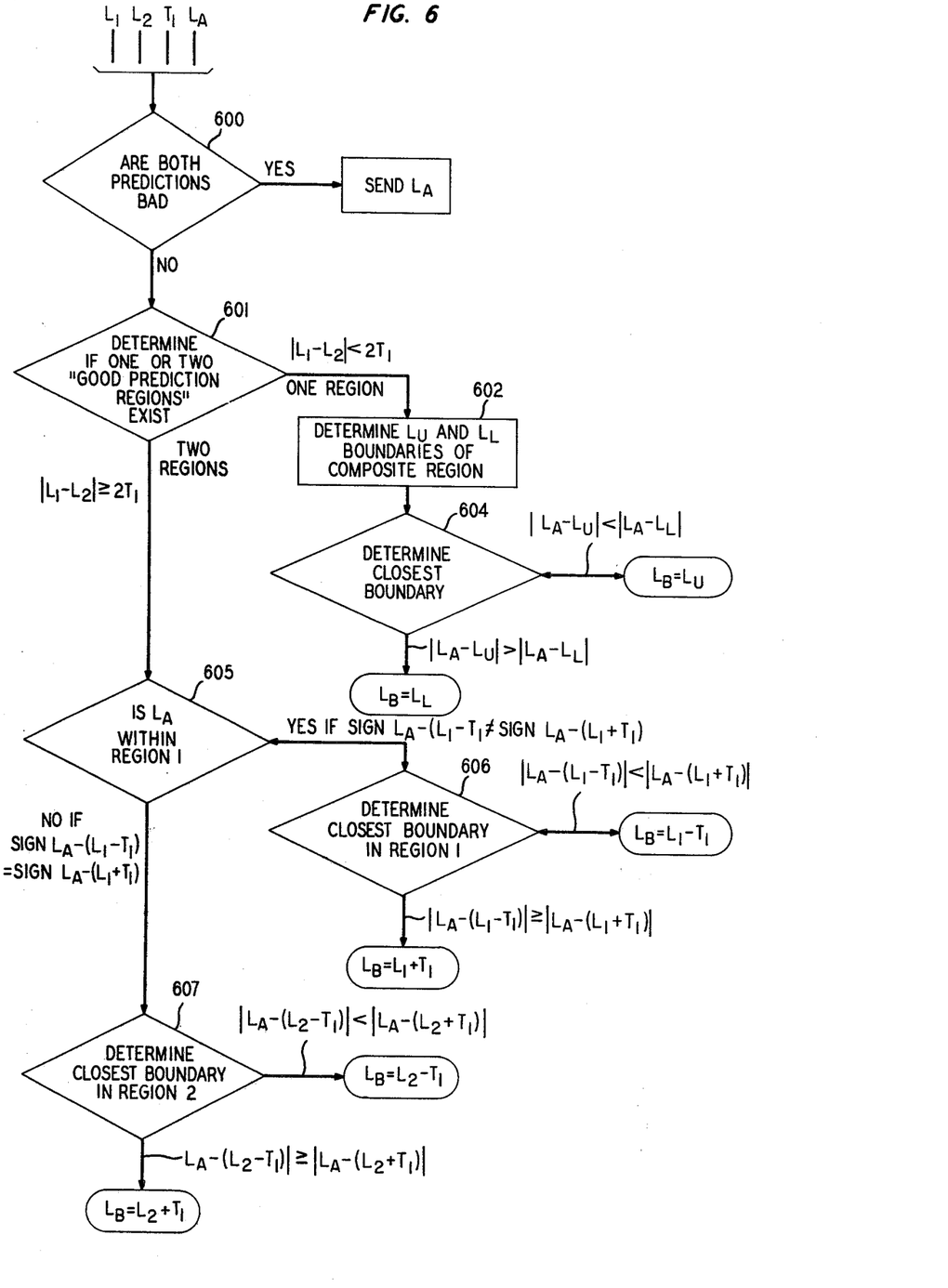
FIG. 6 is a logic flow diagram of the distorter of FIG. 2.

The foregoing can be better understood by reference to the logic flow diagram of FIG. 6. As shown, inputs to the distorter are the present luminance value $L_A$, the predictions thereof $L_1$ and $L_2$, and the threshold value $T_1$ which determines if a prediction is "good". Initially, it is determined (block 600) if either of the predictions ($L_1$ or $L_2$) is a good prediction, by computing $|L_1 - L_A|$ and $|L_2 - L_A|$ and by comparing each difference with $T_1$. If both predictions are bad, $L_A$ need not be distorted.

If at least prediction is good, the existence of one or two "good prediction regions" is next determined by comparing $|L_1 - L_2|$ to $2T_1$ (block 601). If one region exists, its boundaries are then determined as follows (block 602):

Upper boundary $L_U = \text{MAX}\{L_1 + T_1, L_2 + T_1\}$

Lower boundary $L_L = \text{MIN}\{L_1 - T_1, L_2 - T_1\}$.

The boundary closest to $L_A$ is determined (block 604) by comparing the magnitudes of $L_A - L_U$ and $L_A - L_L$.

If two good prediction regions exist, the procedure followed is similar. First, it is determined if $L_A$ is within the region surrounding $L_1$ (block 605) by comparing the signs of $L_A - (L_1 - T_1)$ and $L_A - (L_1 + T_1)$; if within region 1, the closest boundary is determined (block 606), while if not within region 1, then the closest boundary in region 2 is determined (block 607).

The flow diagram of FIG. 6 may be implemented in various circuit arrangements, one of which is shown in FIG. 7. The circuit is arranged to receive input values $L_1$, $L_2$, $L_A$ and $T_1$ on lines 701, 702, 703 and 704, respectively. To determine if "both predictions are bad" (block 600 of FIG. 6), the difference between $L_1$ and $L_A$ is formed in a first algebraic adder 705, and the difference between $L_A$ and $L_2$ is formed in another adder 706. Both differences are individually compared with the value of $T_1$ in comparators 707 and 708, respectively, the outputs of which are high if the predicted values differ from the actual value by more than the threshold. The outputs of comparators 707 and 708 are coupled to an AND gate 709, the output of which controls switch 710, so as to connect the value $L_A$ on line 703 directly to output line 711 if the AND gate output is high. The output of AND gate 709 is inverted in inverter 728, and applied to one input terminal of an AND gate 726.

To determine if one or two good prediction regions exist, the difference between $L_1$ and $L_2$ is computed in an algebraic adder 712, and applied to one input of a comparator 703; the second comparator input is derived from an adder 714, which is arranged to compute $2T_1$ by adding $T_1$ to itself. The output of comparator 713 goes high to indicate that two good prediction regions exist ($|L_1-L_2|>2T_1$), and remains low if only one region exists. The output of comparator 713 is inverted in inverter 725, and connected to the other input of AND gate 726.

In the single region case, the value of $L_L$ (i.e., the lower boundary of the good prediction region) is computed by computing $|L_2-T_1|$ in adder 715, and $|L_1-T_1|$ in adder 716, and selecting the lesser value in a minimum detector 717. Similarly, the value of $L_U$ (the upper boundary of the good prediction region) is computed by computing $|L_1+T_1|$ in adder 718, and $|L_1+T_1|$ in adder 719, and selecting the greater value in a maximum detector 720.

The closest boundary is found by forming $|L_A-L_L|$ in adder 721 and $|L_A-L_U|$ in adder 722. The output of each adder is coupled to a comparator 723, which determines the smaller value and, in response to the comparator output, positions switch 724 to couple $L_U$ or $L_L$ to output line 711 via a switch 727. Switch 727 is closed when both inputs to AND gate 727 are high, i.e., when a single good prediction region exists which contains $L_A$ therein.

If two separate good prediction regions exist, the output of comparator 713 is high, enabling AND gates 730 and 731 to pass signals when second inputs thereto are also high. AND gate 730 is high when $L_A$ is within the $L_2$ region, while AND gate 731 is high when $L_A$ is near $L_1$. Obviously, only one or the other of these AND gates will be high at any time. With respect to the $L_2$ region, the second input to AND gate 730 is derived from the output of exclusive OR gate 732, which receives the sign bit only of the quantities $L_A-(L_2-T_1)$ and $L_A-(L_2+T_1)$; the former is generated in an adder 733, while the latter is generated in an adder 734. Accordingly, if the signs of the quantities are different, the output of AND gate 730 will be high, closing switch 735. This indicates that $L_A$ is in the $L_2$ region. Concurrently, the values of $L_A-(L_2-T_1)$ and $L_A-(L_2+T_1)$ are compared in comparator 736. If the former is greater than or equal to the latter, than the value $L_2+T_1$ derived from the output of adder 719 is coupled through switch 737 to switch 735 and output line 711. Otherwise, switch 737 is repositioned to couple the value $L_2-T_1$ from adder 715 to line 711 via switch 735.

The same arrangement applies in the $L_1$ region. Specifically, the second input to AND gate 731 is derived from the output of exclusive OR gate 742, which receives sign bit information pertaining to the quantities $L_A-(L_1-T_1)$ and $L_A-(L_1+T_1)$; the former is generated in an adder 743, while the latter is generated in an adder 744. Accordingly, if the signs of the quantities are different, the output of AND gate 731 will be high, closing switch 745. This indicates that $L_A$ is in the $L_1$ region. Concurrently, the values of $L_A-(L_1-T_1)$ and $L_A-(L_1+T_1)$ are compared in comparator 746. If the former is greater than or equal to the latter, the value $L_1+T_1$ derived from the output of adder 718 is coupled through switch 747 to switch 745 and output line 711. Otherwise, switch 747 is repositioned to couple the value $L_1-T_1$ from adder 716 to line 711 via switch 745.

Figure 8:
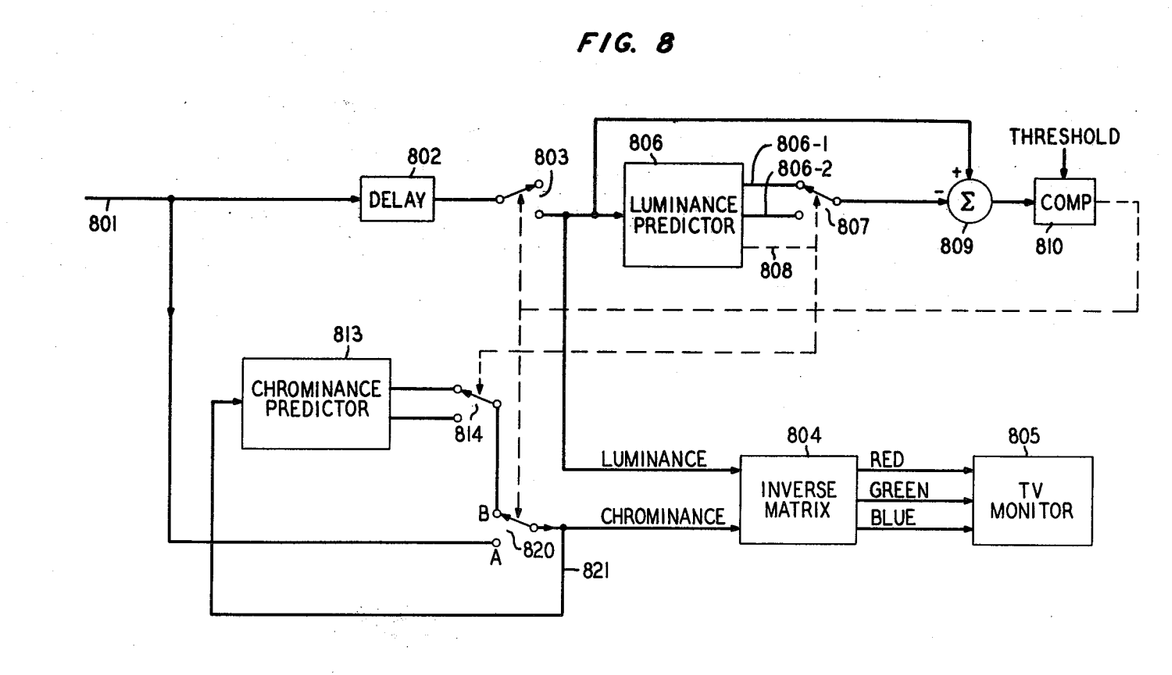
FIG. 8 is a block diagram of a color video signal decoder in accordance with the present invention.

A receiver constructed in accordance with the principles of the present invention is shown in block diagram form in FIG. 8. In this figure, as in FIG. 2, processing for only one chrominance component is shown, it being understood that the second chrominance component is similarly processed.

Input signals to the decoder on line 801, which are assumed to be in PCM form, contain luminance information as well as true chrominance values, in time multiplexed form. The signals are delayed one sample interval in a delay circuit 802, and applied to a switch 803, which is closed during luminance value transmission and open during chrominance value transmission. With switch 803 closed, the received luminance value is connected to the input of an inverse matrix circuit 804, which combines the luminance and chrominance components to generate separate red, green and blue signals in a manner well known to those skilled in the art. These color signals may be applied to a video monitor 805, or other utilization device.

The luminance value is also input to a luminance predictor 806, which is identical to predictor 206 of FIG. 2. Thus, the output of predictor 806 on line 808 is a control signal which indicates the best luminance predictor, and this signal controls the position of switch 807 so as to couple the best prediction (on line 806-1 or 806-2) to one input of a difference circuit 809. The second input to circuit 809 is the received luminance sample value, so that the output of circuit 809 represents the luminance prediction error. This error is compared to $T_1$ in a comparator 810. If the prediction error is below the threshold, the prediction is good and switch 803 remains closed. However, if the prediction error exceeds $T_1$, switch 803 opens. This indicates that the next sample on line 801 will be a true chrominance value.

At the time switch 803 opens, the control signal from comparator 810 repositions switch 820 so as to couple the true chrominance value then present on line 801 to the inverse matrix 804. The same chrominance value is input to chrominance predictor 813 (which is the same as predictor 213 of FIG. 2) on line 821 to update the values stored therein.

With switch 803 closed, switch 820 is positioned so as to couple one of the outputs of chrominance predictor 813 to inverse matrix 804. The best chrominance prediction from predictor 813 is selected, as in FIG. 2, by controlling the position of switch 814 in accordance with the best luminance prediction output on line 808. As in the case of true chrominance value transmission, the predicted chrominances value is fed back to the input of predictor 813 to update its contents.

From the foregoing, it will be observed that the receiver of FIG. 8 does not require any processing of the received luminance samples that are applied to inverse matrix 804. Any luminance values distorted by distorter 222 of FIG. 2 are processed in a manner identical to other luminance values, since the amount of any intentionally introduced distortion is minimized by the apparatus of FIG. 7. However, the luminance samples are processed to determine the best predictor pattern availabe, and the same pattern is used in the chrominance predictor.

Those skilled in the art will appreciate that many modifications and adaptions of the present invention may be made; accordingly, it is intended that the scope of the invention be limited only by the appended claims.

For example, while the foregoing description contemplates using only the one best predictor for the present luminance sample to select the predictor for the present chrominance sample, the invention could be extended to control chrominance predictor selection as a function of the best luminance predictors for several surrounding pels. A majority logic circuit could be used to decide which of the best predictors for neighboring pels is used most often, with the logic output then controlling chrominance predictor selection.

What is claimed is:

1. Apparatus for encoding a sampled video signal for transmission to a remote location, said video signal including a luminance component and a corresponding color component, comprising:

means for computing at least two predictions of the luminance value of a present sample of said signal by forming at least two weighted sums of previous samples' luminance values, each of said weighted sums having an associated prediction error, an optimum one of said weighted sums being associated with the smallest of said prediction errors; and multiplexing means for transmitting an encoded signal to said remote location, said multiplexing means including (a) means for encoding the luminance value of said present sample, and (b) means for encoding the color value of said present sample if said smallest prediction error exceeds a first threshold value.

2. The invention defined in claim 1 wherein said apparatus further includes means for computing a prediction of the color value of said present sample by forming said optimum weighted sum of previous samples' color values, and wherein said multiplexing means further includes means for encoding said color value of said present sample if the difference between said color value of said present sample and said predicted value thereof exceeds a second threshold value.

3. The invention defined in claim 2 wherein said apparatus further includes means for distorting the output of said luminance encoding means if said second threshold is exceeded and said first threshold is not exceeded.

4. Apparatus for encoding a video signal having a luminance component and a corresponding color component comprising:

(a) means for storing previous values of said luminance component;

(b) means for storing previous values of said chrominance component;

(c) means for forming at least two predictions of the present luminance value based upon at least two combinations of previous luminance values;

(d) means for computing the difference between each of said luminance predictions and said present luminance value to determine a particular one of said combinations which produces the smallest luminance prediction error;

(e) means for forming a prediction of the present color value by combining said previous color values in accordance with said particular combination; and (f) means for encoding only said present luminance value if said smallest luminance prediction error is less than a first threshold and the difference between said present color value and said prediction thereof is less than a second threshold.

5. Apparatus for encoding a video signal sampled at a plurality of picture elements (pels), said signal having a luminance component and a corresponding chrominance component, including:

(a) means for computing a plurality of predictions of the luminance value $L_n$ of one of said pels by combining the luminance values of neighboring pels in a corresponding plurality of different patterns;

(b) means for comparing each of said predicted luminance values of said luminance value $L_n$ to select the one of said patterns producing the smallest luminance prediction error;

(c) means for computing a prediction of the chrominance value $C_n$ of said one pel by combining the chrominance values of neighboring pels in accordance with said selected pattern; and (d) output means adapted to sequentially encode said luminance value $L_n$ followed by said chrominance value $C_n$ only if said smallest luminance prediction error exceeds a first threshold value or if the difference between said chrominance value $C_n$ and said prediction thereof exceeds a second threshold value.

6. The invention defined in claim 5 wherein said apparatus further includes means for distorting said luminance value $L_n$ if said second threshold is exceeded but said first threshold is not exceeded.

7. Apparatus for reducing the information transmitted from an encoder to a decoder to represent a video signal sampled at a plurality of elements (pels), each having a chrominance value and a corresponding luminance value, including:

(a) means for forming first and second predictions of the luminance value of a present pel based upon the luminance values of first and second neighboring pels;

(b) means for computing a prediction of the chrominance value of said present pel based upon the chrominance value of the one of said neighboring pels which produced the smallest luminance prediction error; and (c) means for transmitting to said decoder (1) both said present luminance and chrominance values if said smallest luminance prediction error is above a first threshold or if the difference between the present pel's chrominance value and said prediction thereof is above a second threshold, and (2) only said present luminance value if both of said thresholds are not exceeded.

8. The invention defined in claim 7 wherein said apparatus further includes means for intentionally changing said present luminance value is said second threshold is exceeded but said first threshold is not exceeded.

9. A method of encoding a video signal including a luminance component and a corresponding color component, including the steps of:

(a) sampling said video signal at a plurality of picture elements (pels);

(b) predicting the luminance value of a particular pel by forming at least two different weighted sums of luminance values of picture elements neighboring said particular pel;

(c) selecting the one of said weighted sums which produces the smallest luminance prediction error;

(d) predicting the color value of said particular pel by forming said selected weighted sum of color values of picture elements neighboring said particular pel;

(e) comparing said color prediction to said color value to determine the color prediction error;

(f) encoding said luminance value; and (g) encoding said color value, but only if said luminance prediction error exceeds a first threshold value or if said color prediction error exceeds a second threshold value.

10. The invention defined in claim 9 wherein said encoding step includes the step of distorting said luminance value if said second threshold is exceeded but said first threshold is not exceeded.

* * * * *